(12) United States Patent
Pristas et al.

(10) Patent No.: US 9,374,828 B2
(45) Date of Patent: Jun. 21, 2016

(54) CHANNEL ALLOCATION FOR A MULTI-DEVICE COMMUNICATION SYSTEM

(75) Inventors: James Pristas, Barrington, IL (US); Dan Hughes, Suffield, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 2250 days.

(21) Appl. No.: 10/341,264

(22) Filed: Jan. 13, 2003

(65) Prior Publication Data

US 2007/0253361 A1    Nov. 1, 2007

(51) Int. Cl.
| | |
|---|---|
| H04W 4/00 | (2009.01) |
| H04W 72/00 | (2009.01) |
| H04W 72/06 | (2009.01) |
| H04W 84/00 | (2009.01) |

(52) U.S. Cl.
CPC ............ *H04W 72/06* (2013.01); *H04W 84/005* (2013.01)

(58) Field of Classification Search
USPC .................................. 370/310, 328–329, 509
See application file for complete search history.

(56) References Cited

U.S. PATENT DOCUMENTS

| | | | |
|---|---|---|---|
| 3,916,311 A | 10/1975 | Martin et al. | |
| 3,999,182 A | 12/1976 | Moeller et al. | |
| 4,032,845 A | 6/1977 | Via | |
| 4,053,835 A | 10/1977 | Breitenbach | |
| 4,352,200 A | 9/1982 | Oxman | |
| 4,428,078 A | 1/1984 | Kuo | |
| 4,476,574 A | 10/1984 | Struven | |
| 4,647,980 A | 3/1987 | Steventon et al. | |
| 4,835,604 A | 5/1989 | Kondo et al. | |
| 4,866,515 A | 9/1989 | Tagawa et al. | |
| 4,866,732 A | 9/1989 | Carey et al. | |
| 4,887,152 A | 12/1989 | Matsuzaki et al. | |
| 4,896,209 A | 1/1990 | Matsuzaki et al. | |
| 4,897,714 A | 1/1990 | Ichise et al. | |
| 4,958,381 A | 9/1990 | Toyoshima | |
| 5,005,183 A | 4/1991 | Carey et al. | |
| 5,018,165 A | 5/1991 | Sohner et al. | |
| 5,115,463 A | 5/1992 | Moldavsky et al. | |
| 5,189,432 A | 2/1993 | Lombardi et al. | |
| 5,230,085 A | 7/1993 | Loposer | |
| 5,432,838 A | 7/1995 | Purchase et al. | |

(Continued)

FOREIGN PATENT DOCUMENTS

| | | | |
|---|---|---|---|
| EP | 0998101 A2 | 5/2000 | |
| EP | 1017188 A2 | 7/2000 | |

(Continued)

*Primary Examiner* — Patrick Edouard
*Assistant Examiner* — Matthew Genack
(74) *Attorney, Agent, or Firm* — Carlson, Gaskey & Olds P.C.

(57) ABSTRACT

A channel allocation method for a communication network defines a definite purpose channel group that carries signals for definite purpose system devices, such as non-flight critical applications in an aircraft, and a public channel group that carries signals for user devices, such as wireless PDAs, phones and computers used by passengers. By pre-allocating discrete channel groups for different definite purpose system devices and by separating definite purpose channels (for definite purpose system devices) from public channels (for user devices), the invention allows wireless definite purpose system devices and wireless user devices to co-exist in the same operating environment without creating signal interference that could degrade the performance of the devices.

25 Claims, 3 Drawing Sheets

(56) References Cited

U.S. PATENT DOCUMENTS

| | | | |
|---|---|---|---|
| 5,465,395 A | 11/1995 | Bartram | |
| 5,546,050 A | 8/1996 | Florian et al. | |
| 5,596,647 A | 1/1997 | Wakai et al. | |
| 5,717,878 A | 2/1998 | Sannino | |
| 5,732,074 A | 3/1998 | Spaur et al. | |
| 5,781,158 A | 7/1998 | Ko et al. | |
| 5,809,429 A | 9/1998 | Knop et al. | |
| 5,889,775 A | 3/1999 | Sawicz et al. | |
| 5,943,017 A | 8/1999 | Cosenza et al. | |
| 5,966,374 A | 10/1999 | Rasanen | |
| 5,973,722 A | 10/1999 | Wakai et al. | |
| 5,983,096 A * | 11/1999 | Lietha | H04M 3/42314 455/414.1 |
| 6,011,800 A | 1/2000 | Nadgauda et al. | |
| 6,014,381 A | 1/2000 | Troxel et al. | |
| 6,058,288 A | 5/2000 | Reed et al. | |
| 6,081,536 A | 6/2000 | Gorsuch et al. | |
| 6,081,728 A | 6/2000 | Stein et al. | |
| 6,081,729 A | 6/2000 | Bauerschmidt et al. | |
| 6,091,936 A * | 7/2000 | Chennakeshu | H04B 7/18532 370/337 |
| 6,121,933 A | 9/2000 | Cosenza et al. | |
| 6,140,965 A | 10/2000 | Van Hoozen | |
| 6,166,693 A | 12/2000 | Nalbandian et al. | |
| 6,192,416 B1 | 2/2001 | Baxter | |
| 6,201,797 B1 | 3/2001 | Leuca et al. | |
| 6,208,307 B1 | 3/2001 | Frisco et al. | |
| 6,219,355 B1 | 4/2001 | Brodigan | |
| 6,223,055 B1 | 4/2001 | Cyr | |
| 6,236,915 B1 | 5/2001 | Furukawa et al. | |
| 6,269,243 B1 | 7/2001 | Corbefin et al. | |
| 6,292,747 B1 | 9/2001 | Amro et al. | |
| 6,314,272 B1 | 11/2001 | Adrian et al. | |
| 6,321,084 B1 | 11/2001 | Horrer | |
| 6,407,673 B1 | 6/2002 | Lane | |
| 6,408,180 B1 | 6/2002 | McKenna et al. | |
| 6,483,865 B1 | 11/2002 | Beierle | |
| 6,510,515 B1 * | 1/2003 | Raith | H04H 60/23 380/210 |
| 6,661,351 B1 * | 12/2003 | Matsushiro | G08C 19/28 180/168 |
| 6,889,034 B1 * | 5/2005 | Dent | H04B 1/0458 455/102 |
| 6,930,991 B2 * | 8/2005 | Ozluturk | H04B 1/707 370/329 |
| 2001/0001617 A1 * | 5/2001 | Koga | H04B 1/713 375/347 |
| 2002/0090942 A1 * | 7/2002 | Karabinis | H04B 7/18563 455/427 |
| 2003/0088390 A1 * | 5/2003 | Jamsa | H04B 17/0087 703/5 |
| 2003/0100978 A1 * | 5/2003 | Wright | G05D 1/0055 701/31.5 |
| 2003/0198200 A1 * | 10/2003 | Diener | H04L 1/1664 370/329 |
| 2004/0142658 A1 | 7/2004 | McKenna et al. | |
| 2004/0180653 A1 | 9/2004 | Royalty | |
| 2005/0026609 A1 | 2/2005 | Brinkley et al. | |
| 2006/0088001 A1 | 4/2006 | Reitmann et al. | |

FOREIGN PATENT DOCUMENTS

| | | |
|---|---|---|
| EP | 1 096 699 | 5/2001 |
| JP | 11127097 A | 5/1999 |
| WO | WO 99/31822 | 6/1999 |
| WO | WO 00/14987 | 3/2000 |
| WO | WO 00/22488 | 4/2000 |
| WO | 02/080487 | 10/2002 |
| WO | 02/101995 | 12/2002 |
| WO | 02/103932 | 12/2002 |
| WO | 2004/073199 | 8/2004 |

\* cited by examiner

_US 9,374,828 B2_

CHANNEL ALLOCATION FOR A MULTI-DEVICE COMMUNICATION SYSTEM

TECHNICAL FIELD

The present invention relates to communication systems, and more particularly to a channel allocation strategy for communication systems that accommodate multiple users and systems.

BACKGROUND OF THE INVENTION

With the increase in wireless communication methods as well as business travel, there has been a growing demand for systems and services that can connect travelers to their desired data, such as e-mail and Internet web sites, while they are aboard an aircraft. Further, there is a demand to control communication for various aircraft system devices (e.g., in-flight entertainment, in-flight networks, health and prognostics, cabin control, sub-system control, voice over IP, etc.) via wireless channels. To accommodate these multiple demands, broadband communication systems may be used to carry the various signals. As is known in the art, broadband communication systems carry signals through one or more communication paths, or channels, with each channel having its own associated signal frequency.

Currently known systems, however, often do not provide sufficient channel bandwidth and/or channel separation to ensure that transmitted signals do not interfere with each other. In aircraft, for example, currently proposed solutions attempt to send signals associated with definite purpose aircraft system devices and signals from passenger devices over the same frequency channels. This increases the likelihood of signal interference within the aircraft, potentially degrading the operation of the aircraft system devices and/or the passenger devices. For example, if a wireless network in the aircraft is designed to allow passengers to connect to the aircraft's wireless network via an 802.11b-compliant device and the aircraft later installs a security camera also operating according to the 802.11b standard, each wireless device will degrade the bandwidth, and thus the operation, of the other device. As a result, there is currently no known system that allows wireless passenger devices and wireless definite purpose system devices to co-exist reliably.

Currently known systems also do not offer a simple, reliable way to incorporate wireless aircraft system devices in an aircraft while ensuring that the system device signals will not interfere with each other, with other aircraft systems, or with systems in other aircraft. There is currently no standardized way to control and separate signals from different system devices so that signals from different devices remain distinct from each other.

There is a desire for a method and system that allocates broadband channels to accommodate signals from multiple system devices without causing signal interference within a communication system or between different devices operating within the system.

There is also a desire for a method that can be expanded to accommodate devices that are added to the communication system while minimizing the risk of signal interference.

There is a further desire for a method that can separate system device channels from user device channels to allow simultaneous operation of both system devices and user devices without performance degradation in either device type.

SUMMARY OF THE INVENTION

The present invention is directed to a channel allocation method for a communication network that carries signals for both system devices, such as non-flight critical applications in an aircraft, and user devices, such as wireless PDAs, phones and computers used by passengers. A definite purpose channel group is allocated to carry system device signals, while a separate, public channel group is allocated to carry user device signals. The definite purpose channel group has a predetermined number of channels, each channel dedicated to carry signals for a specific system device, and the bandwidth of channels in the definite purpose channel group may be dictated by the anticipated bandwidth requirements of each device. The bandwidth of the public channels may be dictated by, for example, communication standards used by the user devices. In one embodiment, both the system device channels and the user device channels are allocated in unlicensed bands operated at low power.

By pre-allocating discrete channel groups for different system devices and by separating definite purpose channels (for definite purpose system devices) from public channels (for user devices), the invention allows wireless definite purpose system devices and wireless user devices to co-exist in the same operating environment without creating signal interference that could degrade the performance of the devices or interfere with other devices on the aircraft or within a building.

DETAILED DESCRIPTION OF THE EMBODIMENTS

The invention channel allocation strategy assumes that the operating environment is an enclosed space that will have devices associated with a definite purpose system (e.g., aircraft controls, building management devices, train controls, etc.) and devices used by people (e.g., wireless PDAs, phones, computers, pagers, etc.) operating at the same time. Although the description below focuses on channel allocation with respect to a wireless network in an aircraft, the inventive channel allocation method can be applied to any environment where devices associated with a definite purpose system (e.g., aircraft controls/sensors, building management devices, train controls, etc.) and systems and devices used by people (e.g., wireless PDAs, phones, computers, pagers, etc.) may be used at the same time without the signals from the two types of devices interfering with each other.

Generally, the inventive method pre-allocates channels in one or more frequency bands. One or both of the frequency bands may be in an unlicensed frequency band. The channels are grouped into two discrete groups: a definite purpose channel group, which carries, signals for definite purpose system devices, and a public channel group, which carries signals for user devices. The definite purpose channels themselves are subdivided into channel groups where each group corresponds with a particular definite purpose system device.

Figure 1:
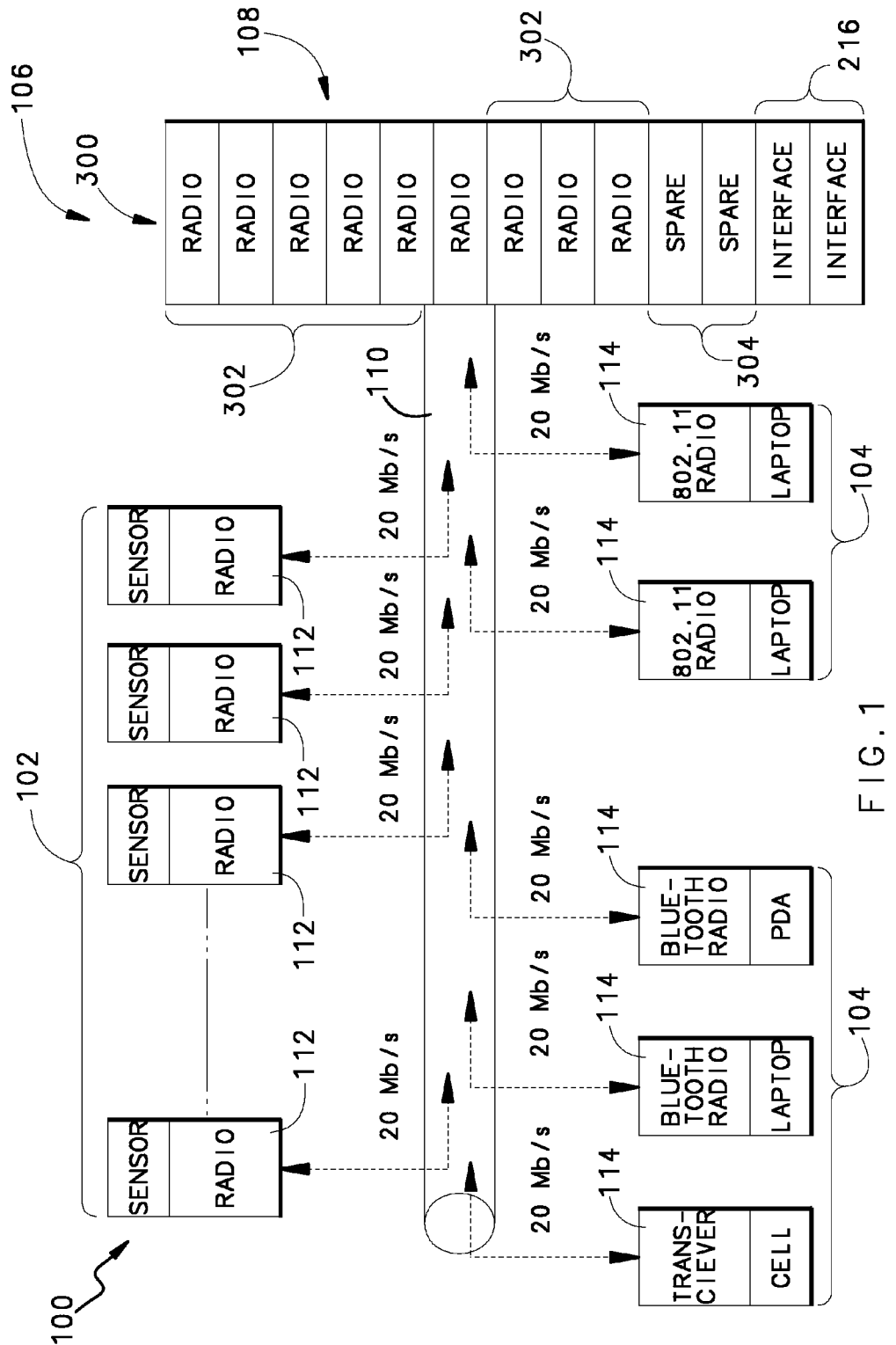
FIG. 1 illustrates an operating environment for one embodiment of the invention.

FIG. 1 is a representative diagram illustrating a possible operating environment 100 for the channel allocation system according to the present invention. Wireless definite purpose system devices 102 and wireless user devices 104 both transmit signals in an enclosed space 106, each forming their own communication network. A base station 108, such as a wireless server, acts as a central communication hub and can be accessed by and send signals to the devices 102, 104. An antenna 110 generates an electric field that couples the base station 108 with the devices 102, 104. In one embodiment, the definite purpose system devices 102 and user devices 104 each have associated radios 112, 114 that send data to and receive data from the antenna 110.

Figure 2:
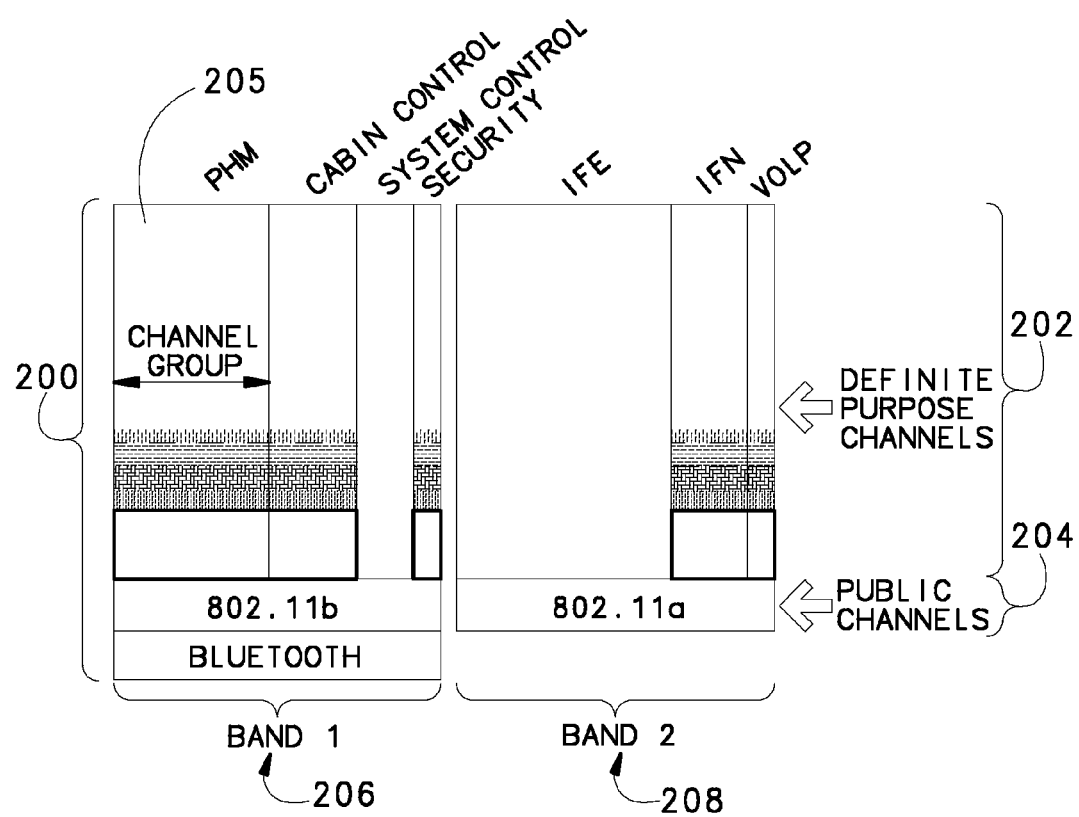
FIG. 2 illustrates a channel allocation according to one embodiment of the invention.

FIG. 2 illustrates a channel allocation according to one embodiment of the invention. As shown in FIG. 2, channels 200 are allocated within each band, with definite purpose channels 202 dedicated to carrying signals related to operation of a definite purpose system and public channels 204 dedicated to carrying signals from user devices. The definite purpose channels 202 and the public channels 204 are kept distinct from each other by, for example, allocating one or more narrow channels in a given band as the public channels 204. Further, the definite purpose channels 202 are divided into discrete channel groups 205, where each channel group 205 corresponds with a given definite purpose system device. The public channels 204 are optional in the channel allocation strategy and can be omitted if user device communication capability is to be prohibited or is otherwise not needed.

In this example, the channels in the present invention are allocated in the 2.4 GHz band 206 and the 5.8 GHz band 208 because these frequency bands are unlicensed bands, allowing operation of the inventive communication system without an FCC license. Channels may also be allocated in licensed frequency bands without departing from the scope of the invention. Regardless of the specific frequency bands used, dividing the channels among two frequency bands allows further subdivision of the definite purpose channel group 202; in this example, signals directed to actual definite purpose system applications (e.g., cabin control, security, etc.) are carried in definite purpose channels 202 associated with one band (the 2.4 Ghz band 206 in this example), while signals used for multimedia and entertainment are carried in definite purpose channels 202 on a separate band (the 5.8 GHz band 208 in this example). This arrangement ensures that signals for monitoring and controlling aircraft functions are kept independent of signals related to more peripheral aircraft functions, such as entertainment.

The channel or channels acting as the public channels 204 are allocated in a given band at frequencies that corresponding with anticipated communication standards used by the user devices 104. As is known in the art, devices operating according to particular communication standards (e.g., 802.11, Bluetooth, etc.) transmit and receive signals over frequencies specified by the standards. The public channels 204, then, may be one or more frequencies called out by the standard. Note that not all of the channels dictated by a given standard need to be included in the public channels 204; instead, the public channels 204 may simply be a few channels selected from the standard. Thus, if a user device 104 wishes to access the wireless network, the base station 108 will first recognize the standard used by the user device 104 and then, if desired, tell the user device 104 to set itself to one of the frequencies allocated to the public channels 204 that corresponds with that standard. In one embodiment, the base station 108 may choose not to give the user device 104 access to the network, allowing the base station 108 to control the number of user devices 104 connected to the network.

In the example shown in FIG. 2, different bandwidths are also allocated as definite purpose channel groups 202 for different definite purpose system devices 102 based on the estimated bandwidth that a given device may require. For example, signals for in-flight entertainment (IFE) and prognostics and health management (PHM) are anticipated to require greater bandwidth than voice over IP (VoIP) or security signals.

Figure 3:
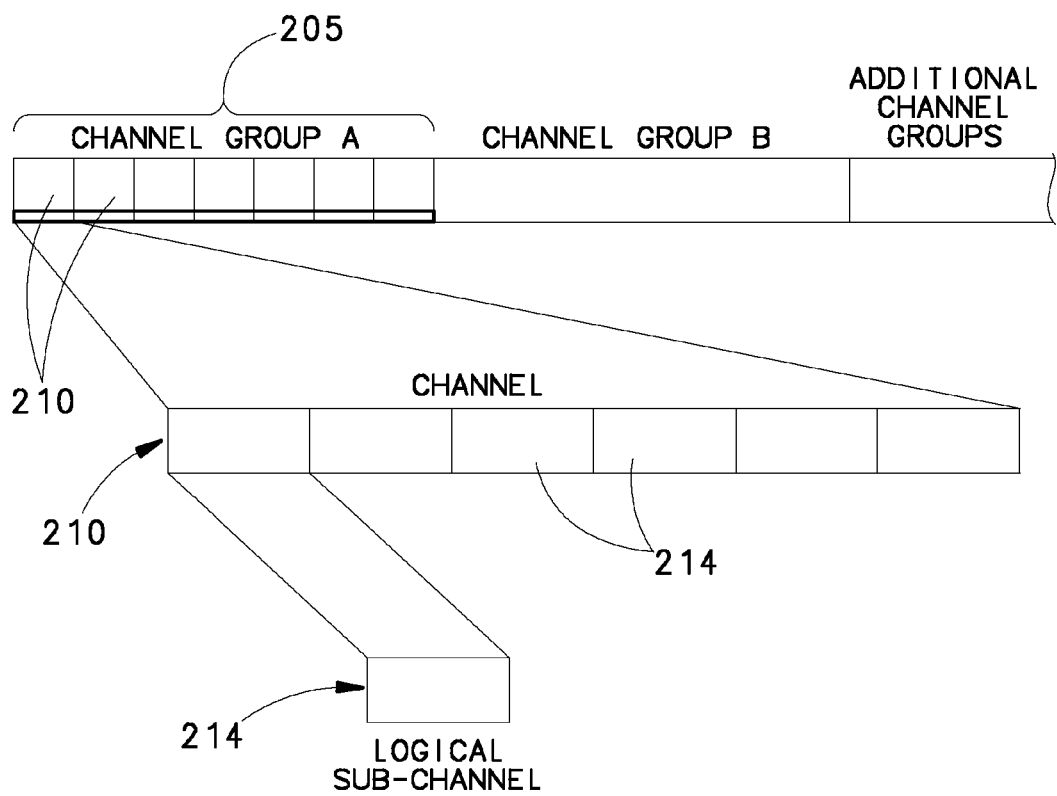
FIG. 3 is a diagram illustrating one embodiment of the channel allocation of FIG. 2 in greater detail.

The channels 210 in the definite purpose channel group 202 can be separated by, for example, frequency separation through carrier separation or as logical channel separations. FIG. 3 illustrates one embodiment of the channel groups in more detail. As noted above, each definite purpose channel 210 in a given definite purpose channel group 202 is dedicated to a specific definite purpose device, system, sub-system, component or function on the aircraft or other operating environment. Each channel 210 can be divided into logical sub-channels 214, which are generated through any known digital signal processing method, to provide channel access. More particularly, a frequency for a given channel can be broken into its component sub-frequencies via digital signal processing and frequency analysis. The sub-frequencies themselves can then be used as data carriers, allowing even more information to be carried within a given available bandwidth.

In one embodiment, the channels 210 in the definite purpose channel group 202 are separated by creating distinct frequency carriers for each channel 210 via frequency multiplexing. If desired, any known modulation scheme can also be used in each channel 210 to enhance the bandwidth for each channel and allow less power to be used to transmit signals for a given bit error rate.

The sub-channels 214 within each channel 210 may be created via code division multiple access (CDMA). CDMA allows the definite purpose system devices 102 to access a channel via data frame packets within a given sub-channel. In one embodiment, interfaces 216 in the base station 108 are set up to access a given sub-channel 214 as a frame within the sub-channel 214. In one embodiment, the interface 216 is assigned a unique address that will identify the interface within the logical sub-channel level and within a channel group.

By assigning specific definite purpose channels 202 to carry signals for particular definite purpose system devices 102, the invention creates a scalable architecture that can accommodate signals from as few or as many definite purpose system devices 102 as desired. Referring back to FIG. 1, the wireless communication network of the invention can be implemented by using a wireless server 300 as the base station 108. In one embodiment, the wireless server is constructed from a core 300, which acts as a computer server and interface to the aircraft data buses, and a plurality of radios 302 attached to a backbone in the core 300. 304 designed to communicate with the radios 112, 114 in the wireless definite purpose system devices 102 and the wireless user devices 104 via the pre-allocated definite purpose channels 202 and public channels 204, respectively.

In one embodiment, the radios 302 correspond to the definite purpose channels 202 are attached to the core 300; the capability to communicate via public channels 204 is then added by connecting additional radios 304 designed specifically to communicate according to the standards (e.g., 802.11, Bluetooth, etc.) used by the public channels 204. Regardless of the radio's location or the device the radio is associated with, each radio operates in only one channel. Note that if a given allocated channel group has a large bandwidth requirement, more than one radio may operate in that channel group, but each radio will still operate in only one channel.

In one embodiment, the radio 112 in a given definite purpose system device 102 is designed to operate in the channel 204 allocated to the specific definite purpose system device 102. If, for example, the radio 112 is in an in-flight entertainment (IFE) device, then the radio 112 is set to send data via the definite purpose channels 202 pre-allocated to in-flight entertainment. The radio or radios 112 corresponding to the IFE device connects to the core 300 via a corresponding radio 302 in the core 300 that also operates in the channel(s) allocated to in-flight entertainment.

Further, the core 300 is designed as a scalable architecture to accommodate as many or as few definite purpose channels 202 as needed by the definite purpose system devices 102 coupled to the core 300. Scalability allows the number of radios 302 added to the core 300 to vary depending on the bandwidth requirements of the definite purpose system devices 102 incorporated in the facility. In other words, all of the definite purpose channels 202 for all anticipated definite purpose system devices 102 may be preallocated according to the inventive method, but the actual number of definite purpose channels 202 carrying data at a given time will be dictated by the number of definite purpose system devices 102, and therefore the number of radios 112, 302, that are actually communicating in the network.

In one embodiment, each channel group 205 may have multiple channels, and therefore multiple radios 302 associated with it. Each channel, however, can have one associated radio 302. Further, each channel may accommodate more than one definite purpose system device or user device. Note that a given channel group may or may not be fully populated with radios 302; therefore, the channel group may not have all of its channels installed via the radios 302.

For example, if only two definite purpose system devices 102 will be incorporated into a given application, then only the two radios 304 associated with those specific definite purpose system devices 102 will send and receive data over the two definite purpose channels 202 in which the two definite purpose radios 302 operate, leaving the other radios 302 in the core 300 inactive or not even installed. If, however, additional definite purpose system devices 102 are connected to the core 300, additional core radios 302 associated with the additional definite purpose system devices 102 are activated or installed, thereby activating additional definite purpose channels 202. Thus, the number of active definite purpose radios 302 in the core 300, and therefore the number of active or installed definite purpose channels 102, depends on the number of definite purpose system devices 102 that are connected to the core 300.

Creating definite boundaries between the definite purpose channels 202 and the public channels 204 allows the definite purpose channels 202 to be prioritized higher than the public channels 204, preserving the integrity of signals transmitted on the definite purpose channels 202. Further, the boundaries ensure that user device signals do not interfere with the definite purpose system device signals even if they are broadcast over the same antenna 110.

Even though the definite purpose channels 202 are isolated from the public channels 204, the definite purpose channels 202 should be able to co-exist with the standards used for the public channels 204, such as 802.11 or Bluetooth, if public channels 204 are to be offered in the wireless communication system. During operation, the user devices 104 will connect to the base station 108 in the wireless communication system through radios 114 (e.g., 802.11 and Bluetooth radios) in the base station 108 that are separate from the radios 112 that connect the definite purpose system devices 102 to the base station 108.

Note that the definite purpose channels 202 do not need to be 802.11 or Bluetooth compliant; that is, the definite purpose channels 202 do not have to comply with all of the protocols set forth by the 802.11 or Bluetooth standards because they are designed to carry data only to and from predetermined definite purpose system devices 102 for a definite purpose. Definite purpose channels 202 may be proprietary protocols specifically developed for, for example, security, reliability and bandwidth requirements of a specific definite purpose system. This allows the definite purpose system devices 102 to operate a proprietary protocol or industry standard protocol, depending on system needs. The public channels 204, however, should be both compatible and compliant with desired standards so that they can carry signals to and from user devices 104 operating according to those standards.

Both types of channels 202, 204 may be operated at power levels that are below the noise level of the operating environment, further reducing the power requirements of the wireless communication system 100 and reducing the likelihood that the signals within the operating environment will interfere with signals outside the operating environment.

By pre-allocating separate definite purpose channels and public channels into separate channel groups, a wireless network can be incorporated into any enclosed space to accommodate both wireless definite purpose system devices (e.g., security devices, monitoring devices, etc.) and wireless user devices while ensuring that the definite purpose system devices will always have a clear communications path, regardless of signal traffic caused by user devices. This increases the reliability of any wireless definite purpose system devices in the wireless network and ensures that they will be able to communicate with each other consistently and without signal interference.

Further, by pre-allocating definite purpose channels between different definite purpose system devices, the capabilities of the wireless communication system incorporating the invention can be expanded by adding system devices. One or more radios corresponding with the definite purpose channels over which the added definite purpose system devices operate would also be added to the core, thereby increasing the number of definite purpose channels that are actually actively carrying data. Thus, additional system devices can be connected to the network without risking signal interference because each device will operate within its own allocated channel.

Because the bandwidth allocated to each device is known, devices can be manufactured to operate specifically within the allocated frequency band. This results in a wireless network that not only separates the definite purpose channels from the public channels, but also provides a modular channel structure that allows wireless definite purpose system devices to be easily added to and removed from the wireless network while guaranteeing that the system devices will be compatible with the network.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A wireless communication method for a non spaced-based network, comprising:
   selecting at least one frequency band for transmitting data within a non spaced-based network;
   allocating a plurality of definite purpose channels in a first portion of the at least one frequency band, wherein the plurality of definite purpose channels corresponds with at least one definite purpose function and wherein each definite purpose channel carries data associated with at least one definite purpose system device to be connected to the network and that carries out one definite purpose function;

allocating separately a second plurality of definite purpose channels in a second portion of the at least one frequency band; and allocating at least one public channel for carrying data corresponding to at least one user device.

2. The wireless communication method of claim 1, wherein the plurality of definite purpose channels is divided into a plurality of definite purpose channel groups, wherein each definite purpose channel group corresponds with one definite purpose function.

3. The wireless communication method of claim 1, further comprising the step of forming a plurality of logical sub-channels within each definite purpose channel.

4. The wireless communication method of claim 3, wherein the logical sub-channels are formed via code division multiple access (CDMA).

5. The wireless communication method of claim 1, wherein said at least one public channel is defined to comply with at least one wireless communication standard used within a local area network communications.

6. The wireless communication method of claim 5, wherein said at least one wireless communication standard is at least one selected from the group consisting of 802.11 and Bluetooth.

7. The wireless communication method of claim 1, wherein allocating the plurality of define purpose channels is based on the at least one definite purpose system device, and allocating the at least one public channel is based on the at least one user device.

8. The wireless communication method of claim 1, wherein the at least one definite purpose function includes a control for an aircraft system, an aircraft sensor, or both.

9. The wireless server of claim 1, wherein the definite purpose system device is separate and distinct from the at least one user device.

10. The wireless communication method of claim 1, wherein the entire non space-based network is within an enclosed space.

11. The wireless communication method of claim 10, wherein the enclosed space is an aircraft.

12. The wireless communication method of claim 10, wherein the non space-based network is a local area network.

13. The wireless communication method of claim 10, including moving the enclosed space and the non space-based network together.

14. A wireless server for a non spaced-based wireless communication network, comprising:

a core acting as a computer server; and an interface coupled to the core, wherein the interface allocates a plurality of definite purpose channels, wherein each definite purpose channel carries data associated with at least one definite purpose system device to be connected to the non space-based wireless communication network, wherein the interface provides a communication link between the definite purpose system device and the core and wherein the interface separately allocates at least one public channel to carry data associated with at least one user device according to a wireless communication standard.

15. The wireless server of claim 14, wherein the interface comprises a plurality of radios, each radio corresponding with one definite purpose channel to communicate with a corresponding radio on the definite purpose system device.

16. The wireless server of claim 15, further comprising a public channel radio corresponding with a public channel to communicate according to a wireless communication standard with a corresponding radio on a user device.

17. The wireless server of claim 14, wherein the interface allocates the plurality of definite purpose channels based on the at least one definite purpose system device, and the interface allocates the at least one public channel based on the at least one user device.

18. The wireless server of claim 14, wherein the definite purpose system device is separate and distinct from the at least one user device.

19. The wireless server of claim 14, wherein the core and the interface are both located within an enclosed space.

20. The wireless server of claim 19, wherein the enclosed space is an aircraft.

21. The wireless server of claim 14, wherein the communication link is a Wi-Fi communication link.

22. A wireless communication method for a network within an enclosed space, comprising:

selecting at least one frequency band for transmitting data within an enclosed space;

allocating a plurality of definite purpose channels in a first portion of the at least one frequency band, wherein the plurality of definite purpose channels corresponds with at least one definite purpose function and wherein each definite purpose channel carries data associated with at least one definite purpose system device to be connected to the network and that carries out one definite purpose function; and allocating separately a second plurality of definite purpose channels in a second portion of the at least one frequency band.

23. The wireless communication method for claim 22, allocating at least one public channel for carrying data corresponding to at least one user device.

24. The wireless communication method for claim 23, wherein the at least one definite purpose system device and the at least one user device are both within the enclosed space.

25. The wireless communication method of claim 22, wherein the enclosed space is an aircraft.

* * * * *